United States Patent
Fernandez De Mendiola Quintana et al.

(10) Patent No.: US 8,444,894 B2
(45) Date of Patent: May 21, 2013

(54) PROCEDURE FOR THE MANUFACTURE OF A TUBE MADE FROM FLEXIBLE MATERIALS

(75) Inventors: Javier Fernandez De Mendiola Quintana, Vitoria (ES); Juan Ignacio Valpuesta Landa, Vitoria (ES)

(73) Assignee: CTL-TH Packaging, S.L. Unipersonal, Minano (Alava) (ES)

( * ) Notice: Subject to any disclaimer, the term of this patent is extended or adjusted under 35 U.S.C. 154(b) by 216 days.

(21) Appl. No.: 12/996,451

(22) PCT Filed: Jun. 4, 2008

(86) PCT No.: PCT/ES2008/000401
§ 371 (c)(1),
(2), (4) Date: Mar. 16, 2011

(87) PCT Pub. No.: WO2009/147254
PCT Pub. Date: Dec. 10, 2009

(65) Prior Publication Data
US 2011/0190108 A1     Aug. 4, 2011

(51) Int. Cl.
*B29C 45/14*     (2006.01)
(52) U.S. Cl.
USPC ............ 264/161; 264/132; 264/255; 264/247

(58) Field of Classification Search
None
See application file for complete search history.

(56) References Cited

U.S. PATENT DOCUMENTS 3,374,527 A * 3/1968 Jarrett ............................ 29/434
3,855,380 A * 12/1974 Gordon et al. ............. 264/37.31

FOREIGN PATENT DOCUMENTS

| EP | 0838327 A2 | 4/1998 |
| EP | 1710068 A1 | 11/2006 |

* cited by examiner

*Primary Examiner* — Edmund H. Lee
(74) *Attorney, Agent, or Firm* — Browdy and Neimark, PLLC

(57) ABSTRACT

Procedure for the manufacture of a tube made of a flexible material and comprising a skirt and a head, in which a unit formed by the skirt and an appendage is disposed or manufactured in an injection procedure, the appendage totally or partially closing one end of the skirt and including the injection point(s), in which the appendage is cut totally or partially, and the cut part is removed, and in which the head overmolded on any area of the part of the unit formed by the skirt and appendage that remains once the cut part has been removed. The appendage offers several advantages, such as improving the finish of the over-molded head or, in the event of the unit being manufactured, easing the removal of the unit from the mound.

13 Claims, 2 Drawing Sheets

PROCEDURE FOR THE MANUFACTURE OF A TUBE MADE FROM FLEXIBLE MATERIALS

TECHNICAL FIELD

The invention relates to a procedure for the manufacture of a tube made of flexible materials, of the type used to store cosmetics, creams, etc. which are formed mainly of a skirt and a head, and which are provided with labels and other decorative elements.

PRIOR ART

The prior art contains numerous known procedures for the manufacture of tubes made of flexible materials and provided with a skirt (a generally cylindrical body, open at both ends) and head (a component that closes one of the two ends of the skirt and which generally comprises a screw-threaded area or other applicably-shaped area capable of allowing the connection of a cap or other closing member). One of the procedures used most widely to date involves the manufacture of the tube skirt by the extrusion of a continuous tube and the subsequent cutting of the tube to obtain the skirt with the required length, and subsequent over-moulding of the head onto said skirt. Another known process is described in WO05072931A1, in which the tube is manufactured as a result of the following process: the skirt of the tube decorated with a label is manufactured in a first injection process provided with in-mould labelling; the head of the tube is over-moulded on the skirt in a second injection process; the tube is then capped; other decorative elements may optionally be added. Another known process is described in WO06082255A1, in which the tube is manufactured as a result of the following process: a skirt-semihead unit (the semihead being a portion of a head partially closing one end of the skirt) decorated with a label is manufactured in a first injection process provided with in-mould labelling; the head of the tube is over-moulded on the skirt in a second injection process; the tube is then capped; other decorative elements may optionally be added. This second method proposed in WO06082255A1 aims to improve the results of the over-moulding of the head. There are other known tube-manufacturing procedures in which the entire tube (skirt and head) is injected at the same time by a single injection process and machine.

This invention aims to provide a procedure for the manufacture of a tube made of flexible materials that resolves certain drawbacks observed in previous procedures due mainly to the limitations of the machines used or which are currently available. For example, the inventive procedure aims to improve the result of the over-moulding of the head on the skirt of the tube.

BRIEF DISCLOSURE OF THE INVENTION

It is an object of this invention to provide a procedure for the manufacture of a tube made of flexible materials, the tube being provided with a skirt and head, in which the skirt has the approximate shape of a prism with a circular, elliptic or other cross-section, with a constant or variable thickness, the skirt forming the body of the tube and being open at its opposite faces, and with the head being a cover that closes at least one of the open faces of the skirt, said head optionally comprising elements for the expulsion of the contents of the tube and for the connection of a cap or other closing member. Said procedure comprises the following phases: the manufacture, in an injection procedure, of a skirt-appendage unit, where the appendage is disposed on one end of the skirt and partially or completely closes said end and where the injection point or points are located in said appendage; the total or partial cutting of the appendage and removal of the cut part; the over-moulding of the head on any part of the skirt-appendage unit that remains following removal of the cut part, i.e., the over-moulding of the head on the area of the unit where the cut is made or on any other area (for example, the end opposite to where the cut is made).

The appendage may be clamped or held in place to thus enable the removal of the skirt-appendage unit from the mould, following its manufacture by the injection procedure. As the appendage is to be cut at a later stage and is thus disposable, there is no problem holding the unit by the appendage, and danger of the skirt (the most important part of the skirt-appendage unit) being contaminated when being held can be avoided. Then, it is not necessary to clean or replace the tool in order to hold several units successively; instead, a single tool may be used. Another advantage offered by the appendage is the fact that it acts as a stopper inside the tube for a sleeve that is inserted in said interior during the cutting operation, thereby facilitating said cutting operation.

The appendage may take various shapes and sizes, depending on the function it has to perform (to enable the clamping, act as a stopper, etc). The detailed disclosure of the invention and the drawings show several embodiments of the appendage.

The inventive procedure provides a tube with a better finish than that obtained with other known procedures. This improved finish is obtained largely as a result of disposing the injection point of the skirt on an appendage connected to the skirt, in other words by moving the injection point away from the tube label.

Preferably, the inventive procedure for the manufacture of the skirt-appendage unit comprises in-mould labelling, by means of which the skirt is supplied with a label. In this particular case, the fact that the injection point or points (a single point will be referred to hereinafter) are disposed on the appendage allows them to be moved away from the skirt and thereby prevent possible problems occurring during the in-mould-labelling process, such as the label creasing, moving, losing colour, etc. This provides for a better finish of the tube than that obtained by procedure WO05072931A1, performed by the machines that are currently available (which make it difficult for the skirt to be injected with a label by means of in-mould labelling, as the injection point of the skirt is very close to or on the label).

The inventive procedure offers several advantages over document WO06082255A1. Firstly, the cycle time (and therefore the cost) is improved, as the inventive appendage can be less thick than the semihead of WO06082255A1 (said semihead should generally be thicker and stiffer than the skirt so that the head can then be over-moulded on it). Secondly, the fact that the injection point is disposed on the appendage, and thus moved away from the label, allows an even flow of material to be achieved in the area of the skirt and the label, which is the most important area of the tube. In addition, the final appearance of the tube is improved because a step that can occasionally appear in tubes manufactured in accordance with the technique disclosed in document WO06082255A1 is removed. The present invention also allows the head to be manufactured in a different colour than the skirt, something that is not possible in the previous technique as the semihead (which is the same colour as the skirt) is not completely hidden or embedded by the head. The present invention also enables the manufacture, using identical skirts, of tubes with different cross-sections (elliptic, circular, etc); all that is required to achieve this is to deform the skirt sufficiently and over-mould the corresponding head.

The present invention also offers certain advantages over procedures for the manufacture of tubes in which the entire tube (skirt and head) is injected by a single operation and injection machine. Firstly, the procedure of the present invention allows the manufacture of different-sized containers in a simple way (the length of the skirt and therefore the capacity of the tube can be varied simply by moving the cutting point). It also allows different materials to be used in the skirt and head, which is sometimes necessary in order to obtain heads with different properties (mechanical, physical/chemical, etc.) to those of the skirt, and which are necessary for certain applications, such as flexible nozzles, applicators, solid bases for meter pumps, etc.

BRIEF DESCRIPTION OF THE DRAWINGS

Details of the invention can be seen in the accompanying non-limiting figures.

DETAILED DESCRIPTION OF THE INVENTION

Figure 1:
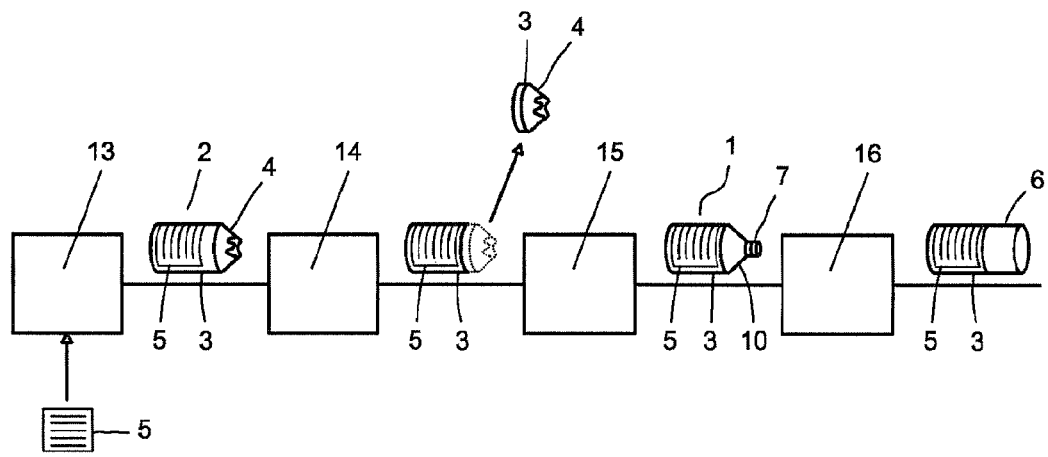
FIG. 1 shows an embodiment of the procedure of the present invention.

FIG. 1 shows an embodiment of the inventive procedure, for the manufacture of a tube (1) made of a flexible material and provided with a skirt (3) and head (10), in which the skirt (3) has the approximate shape of a prism with a circular, elliptic or other cross-section, which forms the body of the tube (1) and which is open at its opposite faces, and with the head (10) being a cover that closes at least one of the open faces of the skirt (3), said head (10) optionally comprising elements (7) for the expulsion of the contents of the tube and for the connection of a cap (6) or other closing member. The procedure of the present invention comprises at least:

an injection phase (13), in which a unit (2) formed by a skirt (3) and appendage (4) is manufactured, where the appendage (4) is disposed on one end of the skirt (3) and partially or totally closes said end, and where the injection point or points of the unit (2) are located on said appendage (4);

a cutting phase (14), in which the appendage (4) is cut totally or partially, in other words at least part of the appendage (4) and optionally all the appendage (4) and even part of the skirt (3) is cut, and the cut part is removed; it should be noted that the figure shows the embodiment in which the entire appendage (4) and part of the skirt (3) is cut;

an over-moulding phase (15), in which the head (10) is over-moulded on any area of the part of the unit (2) formed by the skirt (3) and appendage (4) that remains after the cut part has been removed.

In the embodiment of the figure, the procedure ends with a capping phase (16) in which the tube (1) is provided with a cap (6). This capping phase (16) is optional.

The appendage (4) may be made in any shape or size, totally or partially closing the end of the skirt (3). The appendage (4) may even be a tube head. In other words, the inventive procedure may comprise phases in which an entire tube (skirt and head) is injected, at least part of the head is cut (optionally all of the head and even part of the skirt), and another head is subsequently over-moulded on the remaining portion. This latter embodiment would allow the manufacture of different tubes (provided with different heads) using a batch of identical tubes, provided with identical heads.

Preferably, the injection phase (13) for the manufacture of the unit (2) formed by the skirt (3) and appendage (4) also comprises in-mould labelling, by means of which the skirt (3) is supplied with a label (5). In this particular case, the invention is especially advantageous because the injection point is moved away from said label (5), thereby preventing the appearance of defects in the label (5) during the injection of the unit (2) formed by the skirt (3) and appendage (4).

The appendage (4) may present walls made up of various shapes to enable it to perform its functions (to act as an element for gripping and holding, as a stopper, etc).

Figure 2:
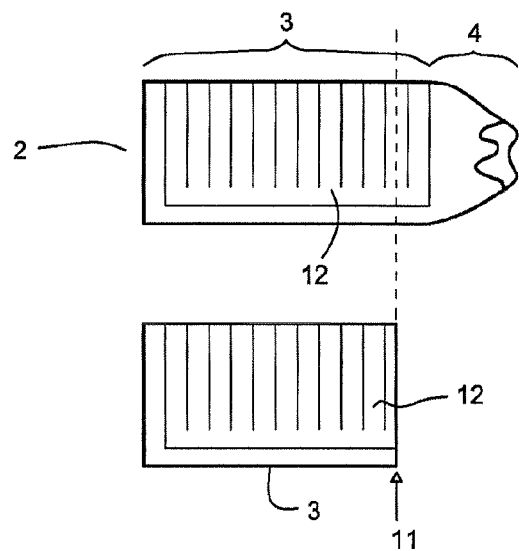
FIG. 2 shows an embodiment of the cutting phase.

In the event that an alternative printing or decorating technique (such as silk-screen printing, hot stamping, offset printing, etc.) is used instead of or in addition to in-mould labelling, the entire surface area of the final skirt (3) can be printed thanks to the invention. As shown in FIG. 2, this is achieved by printing the unit (2) formed by the skirt (3) and appendage (4) and then cutting the appendage (4) and part of the skirt (3) so that the printed decoration (12) on the cut skirt (3) reaches the edge (11) of the skirt (3).

Figure 3:
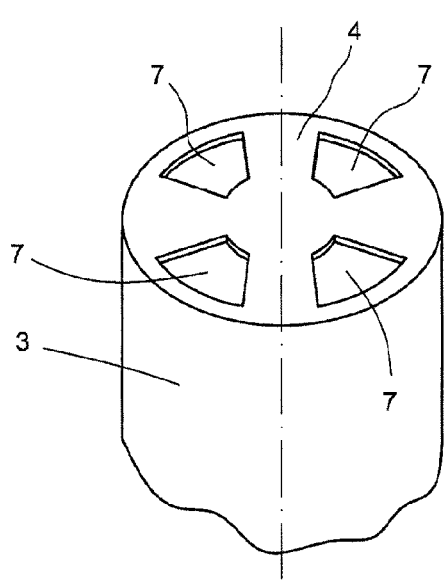
FIG. 3 shows a first embodiment of the appendage.
Figure 4:
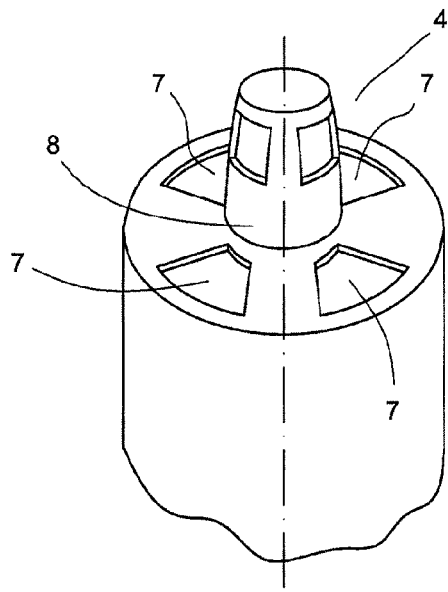
FIG. 4 shows a second embodiment of the appendage.
Figure 5:
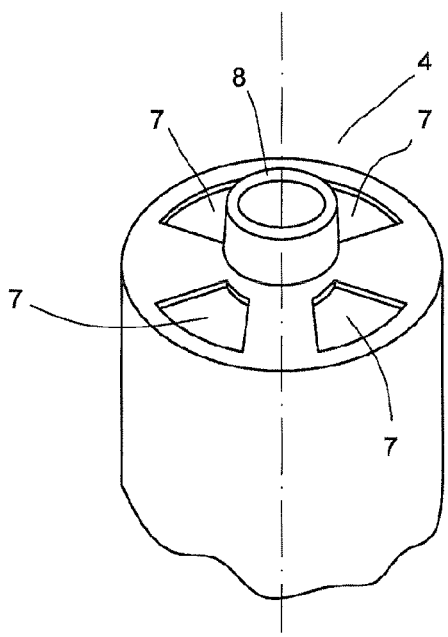
FIG. 5 shows a third embodiment of the appendage.
Figure 6:
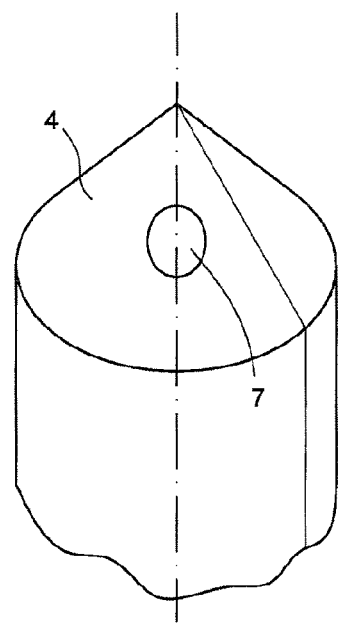
FIG. 6 shows a fourth embodiment of the appendage.

FIGS. 3 to 7 show four embodiments of the appendage (4). FIG. 3 shows an appendage (4) in the form of a lid that closes one end of the skirt (3). Said lid is provided with a series of windows (7), to reduce material waste. FIG. 4 shows a second embodiment in which the appendage (4) also comprises a projection (8). FIG. 5 shows a third embodiment in which the appendage (4) is also a lid provided with windows (7) and a projection (8). FIG. 6 shows a fourth embodiment in which the appendage (4) is a conical cover provided with windows (7). Besides these four embodiments, the appendage (4) may be made in other shapes, with or without windows (7), with or without projections (8), totally or partially capping the end of the skirt (3), etc.

It is another object of this invention to provide a procedure similar to the previous one, in which instead of manufacturing a unit (2) formed by a skirt (3) and appendage (4) in an injection procedure, the procedure according to the invention is provided with a unit (2) formed by a skirt (3) and appendage (4) pre-manufactured in a separate procedure.

The invention claimed is:

1. Procedure for the manufacture of a tube (1) made of a flexible material and provided with a skirt (3) and head (10), in which the skirt (3) forms the body of the tube (1), with said skirt (3) having a circular, elliptic or other cross section and being open at its opposite faces, and with the head (10) being a cover that closes at least one of the open faces of the skirt (3), said head (10) optionally comprising elements (7) for the expulsion of the contents of the tube and for the connection of a cap (6) or other closing member, characterised in that it comprises the following phases:

an injection phase (13), in which a unit (2) formed by a skirt (3) and appendage (4) is manufactured, said unit being provided with one or more injection points, said points being points of entry of the material during the injection phase, where the appendage (4) is disposed on one end of the skirt (3) and partially or totally closes said end, and where the injection point or points are located on said appendage (4);

a cutting phase (14), in which the appendage (4) is cut totally or partially cut and in which the cut part is removed;

an over-moulding phase (15), in which the head (10) is over-moulded on any area of the part of the unit (2)

formed by the skirt (3) and appendage (4) that remains after the cut part has been removed.

2. Manufacturing procedure according to claim 1, wherein the head (10) is over-moulded on the area in which the cut of the unit (2) formed by the skirt (3) and appendage (4) is made.

3. Manufacturing procedure according to claim 1, wherein the appendage (4) is partially cut.

4. Manufacturing procedure according to claim 1, wherein the appendage (4) is cut in its entirety.

5. Manufacturing procedure according to claim 4, wherein part of the skirt (3) is also cut.

6. Manufacturing procedure according to claim 5, wherein, prior to the cutting phase (14), the skirt-appendage unit is decorated by means of an alternative printing or decorating technique, and in that the cutting phase (14) the appendage (4) and part of the skirt (3) is removed so that the decoration on the remainder of the skirt reaches the edge of said skirt (3).

7. Manufacturing procedure according to claim 1, wherein the injection phase (13) comprises in-mould labelling, by means of which the skirt (3) is supplied with a label (5).

8. Procedure for the manufacture of a tube (1) made of a flexible material and provided with a skirt (3) and head (10), in which the skirt (3) forms the body of the tube (1), with said skirt (3) having a circular, elliptic or other cross section and being open at its opposite faces, and with the head (10) being a cover that closes at least one of the open faces of the skirt (3), said head (10) optionally comprising elements (7) for the expulsion of the contents of the tube and for the connection of a cap (6) or other closing member, characterised in that it comprises the following phases:

being provided with a unit (2) formed by a skirt (3) and appendage (4), where the appendage (4) is disposed on one end of the skirt (3) and totally or partially closes said end, said unit being provided with one or more injection points, and where the injection point or points are located on said appendage;

a cutting phase (14), in which the appendage (4) is totally or partially cut and in which the cut part is removed;

an over-moulding phase (15), in which the head (10) is over-moulded on any area of the part of the unit (2) formed by the skirt (3) and appendage (4) that remains after the cut part has been removed.

9. Manufacturing procedure according to claim 8, wherein the head (10) is over-moulded on the area in which the cut of the unit (2) formed by the skirt (3) and appendage (4) is made.

10. Manufacturing procedure according to claim 8, wherein the appendage (4) is partially cut.

11. Manufacturing procedure according to claim 8, wherein the appendage (4) is cut in its entirety.

12. Manufacturing procedure according to claim 11, wherein part of the skirt (3) is also cut.

13. Manufacturing procedure according to claim 12, wherein, prior to the cutting phase (14), the skirt-appendage unit is decorated by means of an alternative printing or decorating technique, and in that during the cutting the appendage (4) and part of the skirt (3) is removed so that the decoration on the remainder of the skirt reaches the edge of said skirt (3).

* * * * *